March 3, 1936.   R. E. IRISH   2,032,936
SOLDERING IMPLEMENT FOR USE IN ASSEMBLING ORTHODONTIC DEVICES
Filed April 19, 1932
FIG. 1.
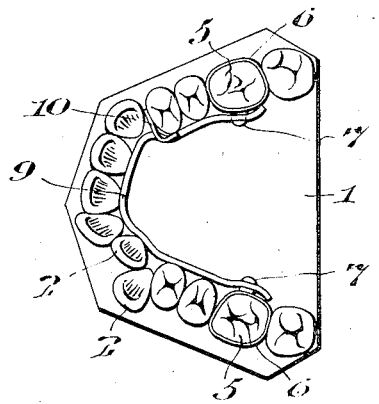
FIG. 2.
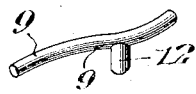
FIG. 3.
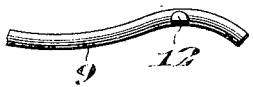
FIG. 4.
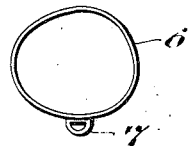
FIG. 5.
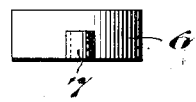
FIG. 6.
FIG. 8.
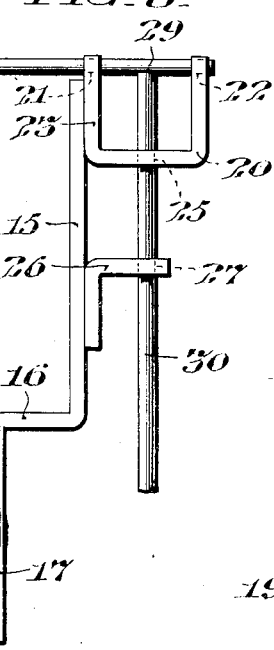
FIG. 7.
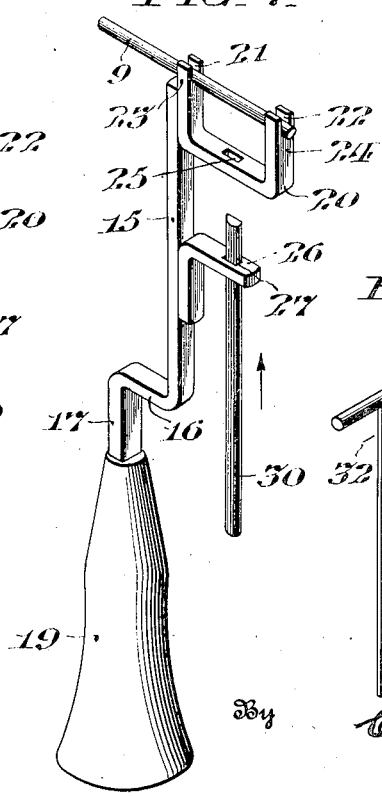
FIG. 9.
Inventor
Russell E. Irish,
By Clifton C. Callowell
Attorney Patented Mar. 3, 1936

2,032,936

UNITED STATES PATENT OFFICE 2,032,936

SOLDERING IMPLEMENT FOR USE IN ASSEMBLING ORTHODONTIC DEVICES

Russell E. Irish, Pittsburgh, Pa.

Application April 19, 1932, Serial No. 606,163

5 Claims. (Cl. 113—99)

My invention relates particularly to that class of holding implements that are commonly known as jigs and is especially directed to structure for assembling by solder, an orthodontic arch-bar and its tooth engaging prongs.

The principal objects of my invention are to provide a frame for assembling the component parts of an arch-bar structure, by which the tooth connecting prongs may be applied to the arch-bar with mathematical accuracy.

Other objects of my invention are to provide a soldering jig that may be conveniently held by the hand of the operator and provided with means for supporting an arch-bar in a position intersecting the path of a prong forming wire guided by said frame and disposed transversely to said arch-bar so that when thrust into abutment therewith they may be rigidly joined by solder.

Specifically stated, the form of my invention as hereinafter described comprises a specially devised frame having an offset stem terminating at one end in a handle and provided at the other end with an arch-bar supporting yoke and also provided intermediate of its ends with a bracket having an aperture disposed in alinement with a similar aperture in said yoke and cooperatively associated to provide a guide for the wire from which the tooth connecting prongs are formed.

My invention also includes all of the various novel features of construction and arrangement as hereinafter more definitely specified.

In the accompanying drawing, Figure 1 is a plan view of an arch-bar as applied to a denture model indicating several malposed teeth in the dental arch; Fig. 2 is a fragmentary perspective view showing one end portion of the arch-bar with the tooth connecting prong soldered thereto; Fig. 3 is an inverted fragmentary plan view of that portion of the arch-bar structure shown in Fig. 2; Fig. 4 is an enlarged plan view of the anchor tooth-band of which there are two shown in Fig. 1 at the respective terminal portions of the arch-bar; Fig. 5 is an enlarged side elevational view of the tooth-band shown in Fig. 4; Fig. 6 is a perspective view of the tubular bracket per se as shown attached to the tooth-band illustrated in Figs. 4 and 5; Fig. 7 is a perspective view of the jig structure by which the arch-bar and its tooth connecting prong forming wire are held while being assembled and rigidly secured together by a soldering operation, the prong forming wire being shown as entered through one guide aperture and directed toward the other in the act of being thrust into abutted engagement with the arch-bar which is shown held by said jig; Fig. 8 is a side elevational view of the jig structure shown in Fig. 7 but with the handle removed and showing the handle engaging tang, and also showing the arch-bar and its prong forming wire in abutted contact relation to receive the solder; and Fig. 9 is a perspective view of the arch-bar before bending, and having its tooth connecting prong forming wire soldered thereto at one end portion thereof and ready to be cut off at the desired distance from the arch-bar as indicated.

In said figures, the denture model 1 has mounted therein a plurality of malposed teeth 2 forming the dental arch and the anchor teeth 5, to each of which a tooth-band 6 having the tubular bracket 7, best illustrated in Figs. 4 and 5, is attached as shown in Fig. 1.

The tooth-bands 6, when attached to the teeth 5, serve as anchorages for the arch-bar 9 which may in practice be distorted to suit each individual case, of which the one illustrated in Fig. 1 is typical, and said arch-bar may be provided with any desired number and forms of tooth engaging means, of which the L-shaped spring wire finger 10 is typical.

As shown in Figs. 2 and 3, the terminal portions of the arch-bar 9, which may be of any desired cross-section but, as illustrated, is formed of cylindrical wire of the desired gauge, are provided with short projecting prongs 12 preferably formed of wire of half-round cross-section and of a size to snugly fit in the half-round tubular bracket 7 shown in Figs. 4, 5 and 6.

It has heretofore been an extremely difficult and tedious operation to accurately attach the projecting prongs 12 to the arch-bar 9 without mechanical means for holding the constituent parts during the soldering operation.

The implement or jig illustrated in Figs. 7 and 8 is designed to perform the function of bringing together the component elements of the arch-bar structure and holding them in proper alinement and angular relation during the soldering operation.

Said implement comprises the stem 15 provided with the offset 16 and terminating in the shank 17 extending into the handle 19 by which the implement may be conveniently held by the hand of the operator, and carries at its outer end the yoke 20 having the alined grooves 21 and 22 in the free ends of its relatively parallel arms 23 and 24, and having the rectangular aperture 25 intermediate of said arms.

The stem 15 is also provided, intermediate of the yoke 20 and handle 19, with the bracket 26 having the rectangular aperture 27 similar to the aperture 25 in the yoke 20 and in alinement therewith.

As shown in Fig. 7, the end portion of the arch-bar 9 is engaged in the alined grooves 21 and 22, and the half-round wire 30 from which the prongs 12 are formed is threaded through the apertures 27 and 25, being thrust upwardly as indicated by the arrow in Fig. 7 until it is abutted against the arch-bar 9, as shown in Fig. 8, and when thus held a drop of solder may be applied as at 29 to unite them rigidly together in unitary relation, as indicated in Fig. 9.

Having thus formed the structure shown in Fig. 9, it only remains to sever the half-round wire 30 along the dash line 32 thereon indicated to form the arch-bar having the anchor engaging projecting prong 12, as shown in Fig. 2, and when both ends of the arch-bar have been provided with a projecting prong relatively parallel, it is ready for attachment to the anchor teeth 5, as shown in Fig. 1.

My invention is advantageous in that the component parts of the arch-bar structure are positively directed and accurately held in a predetermined relation during the process of unionizing them, and consequently arch-bars thus formed will all be uniform.

I do not desire to limit my invention to the precise details of construction and arrangement as herein set forth, as it is obvious that various modifications may be made therein without departing from the essential features of my invention as defined in the appended claims.

Having thus described my invention, I claim:

1. An implement of the class described, comprising a frame having a stem provided with an offset intermediate of its ends, a handle at one end thereof, a yoke at the other end having relatively alined grooves respectively in its free ends and an aperture intermediate thereof, and a bracket on said stem disposed between said offset and yoke and provided with an aperture in alinement with the aperture in said yoke, both apertures being so disposed that a prong-forming wire threaded therethrough will be abutted in relatively angular relation to an arch-bar supported in said grooves and so held while being soldered thereto.

2. A hand supported implement of the class described, comprising a frame having a handle and including wire holding means arranged to hold a wire in transverse relation to the length of said handle, said frame being provided with wire guiding means closely disposed in substantially parallel relation to said handle and in such position that a wire extended therethrough may be moved or held therein by the thumb and finger of the hand of the operator while grasping said handle, into contact with the wire transversely held by said wire-holding means.

3. A hand supported implement of the class described, comprising a frame having a bifurcated end affording spaced wire receiving seats and including a handle by which it may be held by the hand of the operator, said frame being provided with wire guiding means arranged to slidably direct a wire into abutted transverse engagement with a wire disposed in said seats while being soldered and in such position with respect to said handle as to be conveniently engaged by the operator's thumb and finger while grasping the handle whereby the guided wire may be moved in said guiding means by movement of the thumb and finger with respect to the seated wire and held in contact therewith.

4. A hand supported implement of the class described, comprising a frame having a handle and including wire holding means arranged to hold a wire in transverse relation to the length of said handle, said frame being provided with wire guiding means providing an elongated rectangular passageway for the guided wire and closely disposed in parallel relation to said handle and arranged to guide a wire in relatively transverse abutted relation to the held wire whereby a half-round wire may be moved through said rectangular passage-way by the thumb and finger of the operator while grasping said handle.

5. A hand implement of the class described comprising a handle supporting a frame having relatively separated prongs affording spaced open seats for receiving wire, and having wire guiding means directing a wire into transverse engagement with a wire supported in said seats and disposed in a plane extending through the open side of said seats.

RUSSELL E. IRISH.